(12) United States Patent
Kanehisa

(10) Patent No.: US 7,562,943 B2
(45) Date of Patent: Jul. 21, 2009

(54) BICYCLE COMPONENT SECURING STRUCTURE

(75) Inventor: Takanori Kanehisa, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/934,215

(22) Filed: Nov. 2, 2007

(65) Prior Publication Data

US 2009/0115241 A1    May 7, 2009

(51) Int. Cl.
*B60B 35/00* (2006.01)
*F16B 21/00* (2006.01)

(52) U.S. Cl. .............. 301/124.2; 403/322.4; 403/374.5

(58) Field of Classification Search .............. 301/124.1, 301/124.2, 110.5; 280/279, 280, 288; 403/321, 403/322.1, 322.4, 374.1, 374.2, 374.3, 374.4, 403/374.5
See application file for complete search history.

(56) References Cited

U.S. PATENT DOCUMENTS 5,135,330 A * 8/1992 Chen ........................ 403/374.5
5,622,412 A   4/1997 Yamane
6,260,931 B1  7/2001 Stewart
2005/0264097 A1 * 12/2005 Meggiolan .............. 301/110.6
2007/0209468 A1 * 9/2007 Yu ............................. 74/519

* cited by examiner

*Primary Examiner*—S. Joseph Morano
*Assistant Examiner*—Kip T Kotter
(74) *Attorney, Agent, or Firm*—Global IP Counselors, LLP

(57) ABSTRACT

A bicycle component securing structure includes a shaft, a head, a lever and a pivot pin. The head has a recess with the shaft at least partially disposed therein. The lever has portions disposed on opposite sides of the head. The pivot pin couples the head and the lever to the shaft. The pivot pin has a cam section disposed between first and second end sections. The cam section is disposed within the recess to longitudinally move the shaft relative to the head in response to movement of the lever. The first end section is non-rotatably mounted in a first mating hole of the lever such that the lever and pivot pin rotate together. The first end section has a larger maximum transverse width than the second end section. The second end of the pivot pin is retained within the lever.

23 Claims, 11 Drawing Sheets

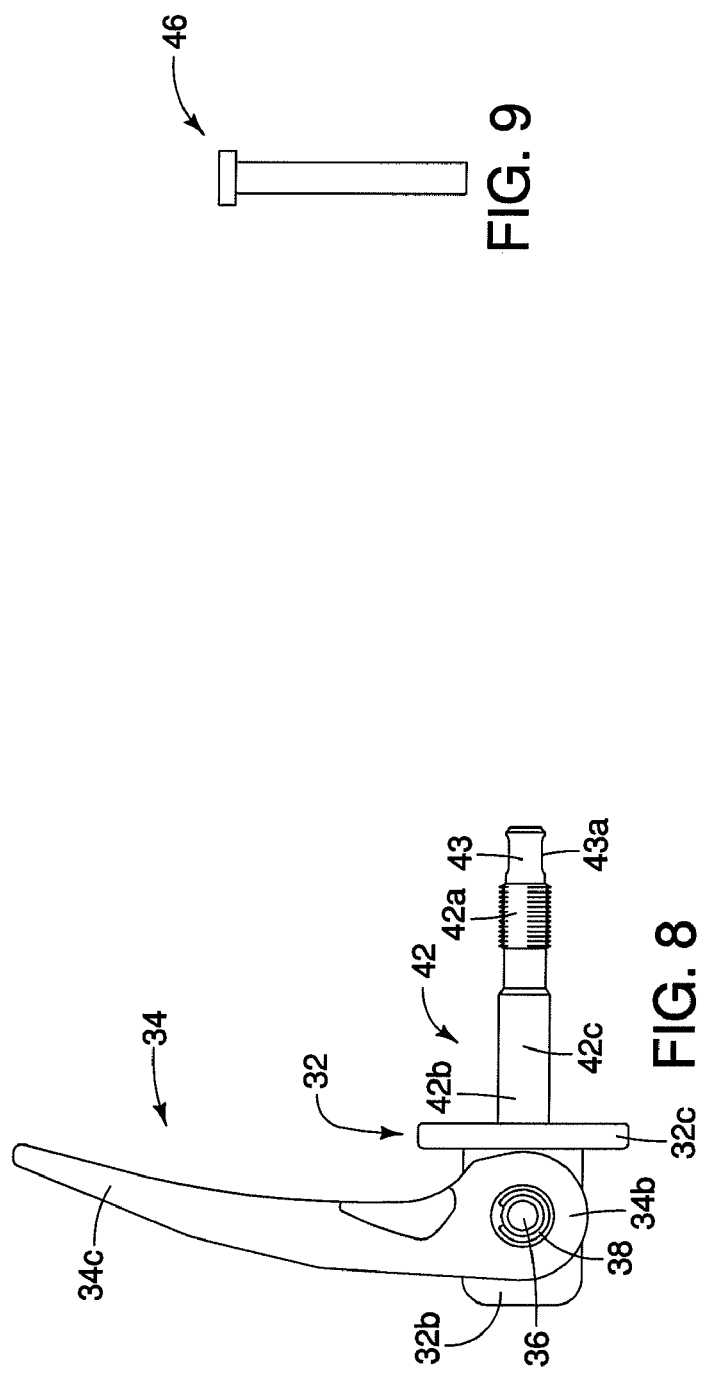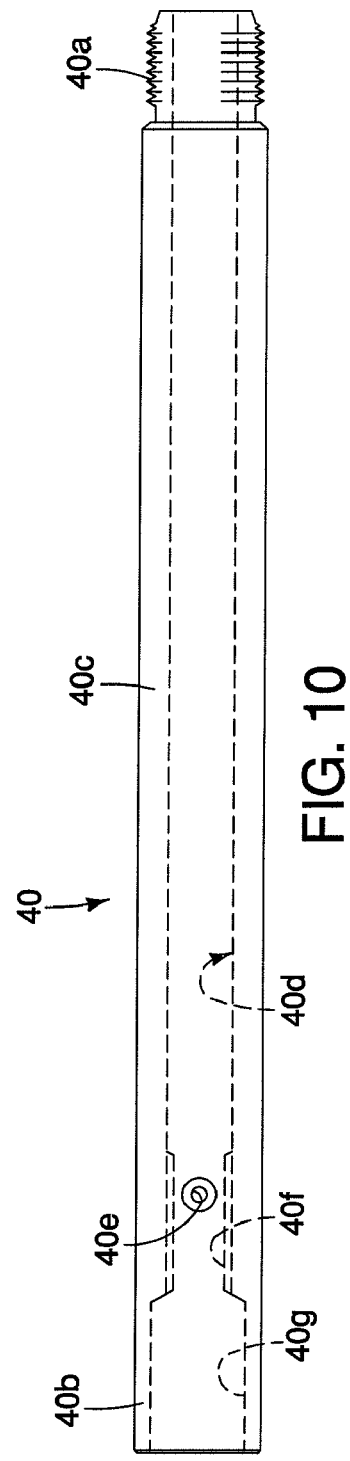

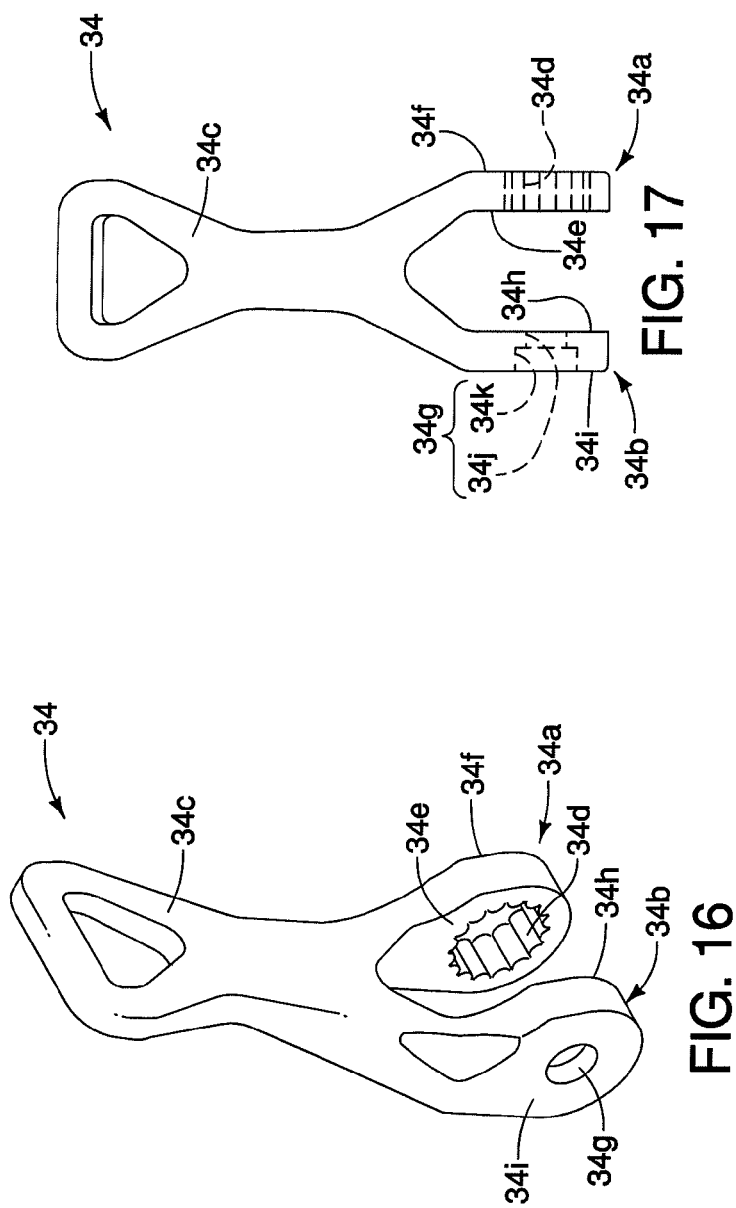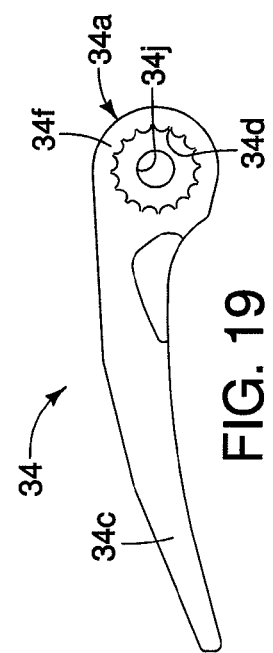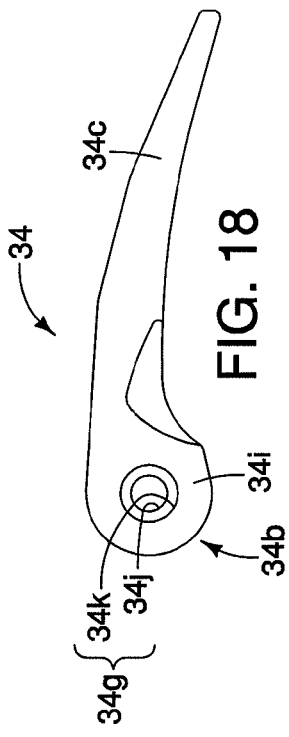

BICYCLE COMPONENT SECURING STRUCTURE

BACKGROUND OF THE INVENTION

1. Field of the Invention

This invention generally relates to a bicycle component securing structure. More specifically, the present invention relates to a bicycle component securing structure, which reliably and firmly secures a bicycle component such as a bicycle wheel hub.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle component attachment mechanism, which is used to attach bicycle components such as bicycle hubs, seat posts and the like to the bicycle frame.

In the past various bicycle parts have been attached using nut and bolt arrangements. However, while certain bicycle parts are designed to be permanently attached to the bicycle, other bicycle parts such as bicycle wheels, seat posts and the like need to be loosened relatively often for removal and/or adjustment. For example, bicycle wheels need to be removed from the frame whenever there is a flat tire. Moreover, bicycle wheels often need to be removed in order to transport a bicycle in an automobile. Bicycle seat posts need to be loosened for height adjustment of the seat. Also, bicycle seat posts sometimes need to be removed (e.g., for transportation of the bicycle or to prevent theft of the seat and seat post).

Due to the need to remove and reinstall certain bicycle components such as bicycle wheel hubs, securing mechanisms have been provided in order to facilitate easier removal and reinstallation of certain bicycle components. A conventional securing mechanism includes a skewer having a threaded end and a securing member mounted at the other end. The securing member includes a base with a lever and a cam structure. A nut or similar member is detachably threaded onto the threaded end of the skewer. When the lever is moved, the securing member and the skewer move axially relative to each other in order to provide a clamping action between the securing member and the nut or similar member. While these typical securing mechanisms generally work well, there has been demand for a tighter connection by some riders. Also, these typical securing mechanisms can be relative cumbersome and expensive to manufacture and/or assemble. Finally, these typical securing mechanisms may not move as smoothly as desired by some riders.

In view of the above, it will be apparent to those skilled in the art from this disclosure that there exists a need for an improved bicycle component securing structure. This invention addresses this need in the art as well as other needs, which will become apparent to those skilled in the art from this disclosure.

SUMMARY OF THE INVENTION

One object of the present invention is to provide a bicycle component securing structure, which provides a tight connection, yet is relatively easy to tighten.

Another object of the present invention is to provide a bicycle component securing structure, which is relatively simple and inexpensive to manufacture and/or assemble.

The foregoing objects can basically be attained by providing a bicycle component securing structure, which comprises a shaft, a head member, a lever member and a pivot pin. The shaft has a first end portion and a second end portion with a longitudinal axis extending between the first and second end portions. The head member has a recess with the first end portion of the shaft member at least partially disposed therein. The lever member has first and second attachment portions disposed on opposite sides of the head member and an operating portion extending from the first and second attachment portions away from the head member. The pivot pin couples the head member and the lever member to the first end portion of the shaft member. The pivot pin has a first non-circular end section, a second end section and a cam section. The first non-circular end section is non-rotatably mounted in a non-circular first mating hole of the first attachment portion such that the lever member and pivot pin rotate together about a pivot axis. The second end section is received in a second hole of the second attachment portion. The cam section is disposed between the first and second end sections within the recess of the head member to longitudinally move the shaft member relative to the head member in response to movement of the lever member about the pivot axis. The first non-circular end section has a first maximum transverse width larger than a maximum transverse cam width of the cam section, and the maximum transverse cam width of the cam section is larger than a second maximum transverse width of the second end section. The second end section of the pivot pin is retained within the second attachment portion of the lever member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 8 is a longitudinal elevational view of the assembled inner axle, head member, lever member and pivot pin of the wheel securing axle illustrated in FIGS. 2-7;

FIG. 9 is an enlarged elevational view of a fastener used to secure the inner and outer axles of the wheel securing axle illustrated in FIGS. 1-7 together;

FIG. 10 is a longitudinal elevational view of the outer axle of the wheel securing axle illustrated in FIGS. 2-7;

FIG. 16 is an enlarged, perspective view of the lever member of the wheel securing axle illustrated in FIGS. 1-12;

FIG. 17 is a longitudinal (plan) view of the lever member illustrated in FIG. 16;

FIG. 18 is a first side elevational view of the lever member illustrated in FIGS. 16 and 17; and FIG. 19 is a second side elevational view of the lever member illustrated in FIGS. 16 and 17.

DETAILED DESCRIPTION OF THE PREFERRED EMBODIMENTS

A selected embodiment of the present invention will now be explained with reference to the drawings. It will be apparent to those skilled in the art from this disclosure that the following descriptions of the embodiment of the present invention are provided for illustration only and not for the purpose of limiting the invention as defined by the appended claims and their equivalents.

Figure 1:
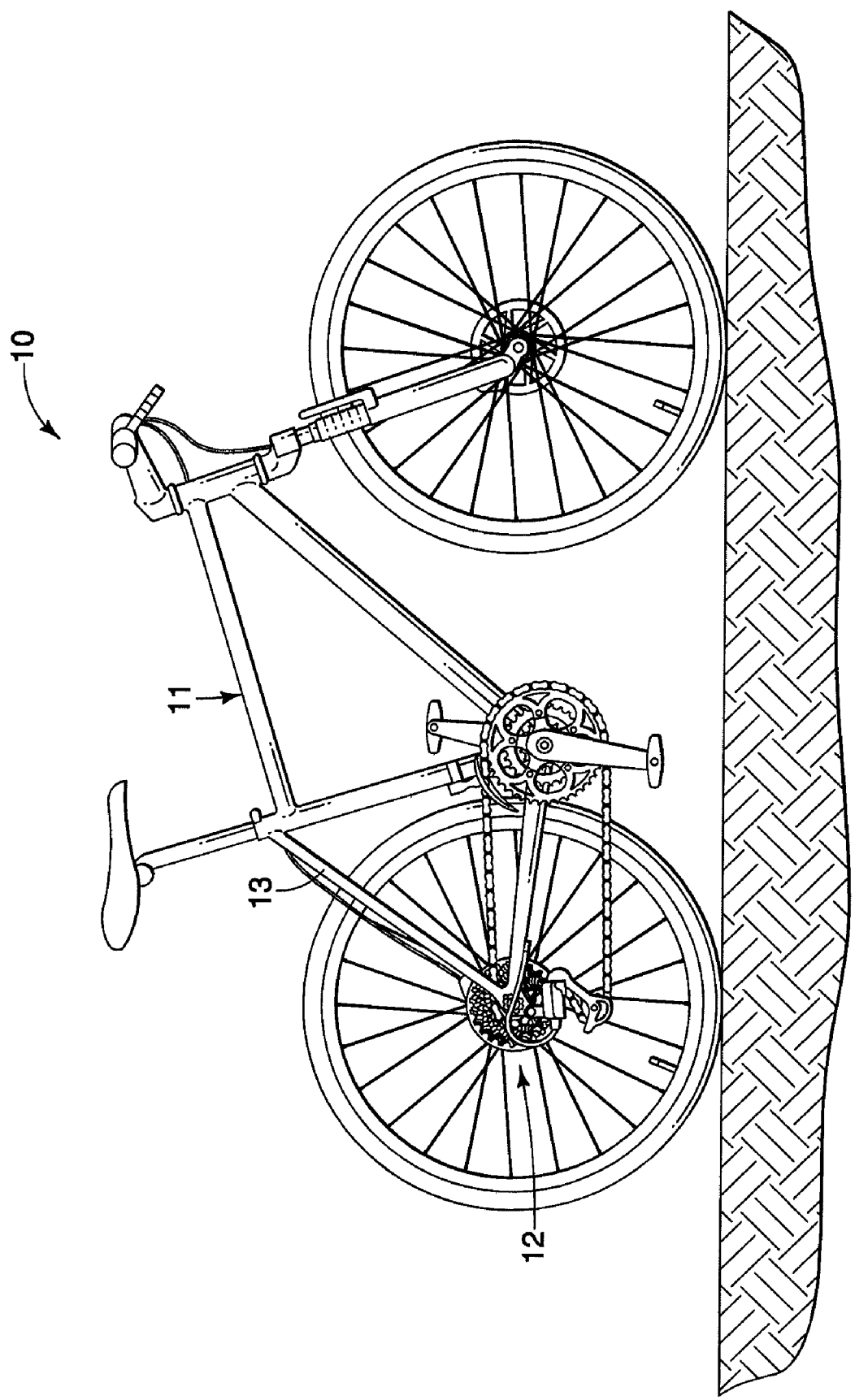
FIG. 1 is a side elevational view of a bicycle with a rear bicycle hub coupled thereto in accordance with a first embodiment of the present invention.
Figure 2:
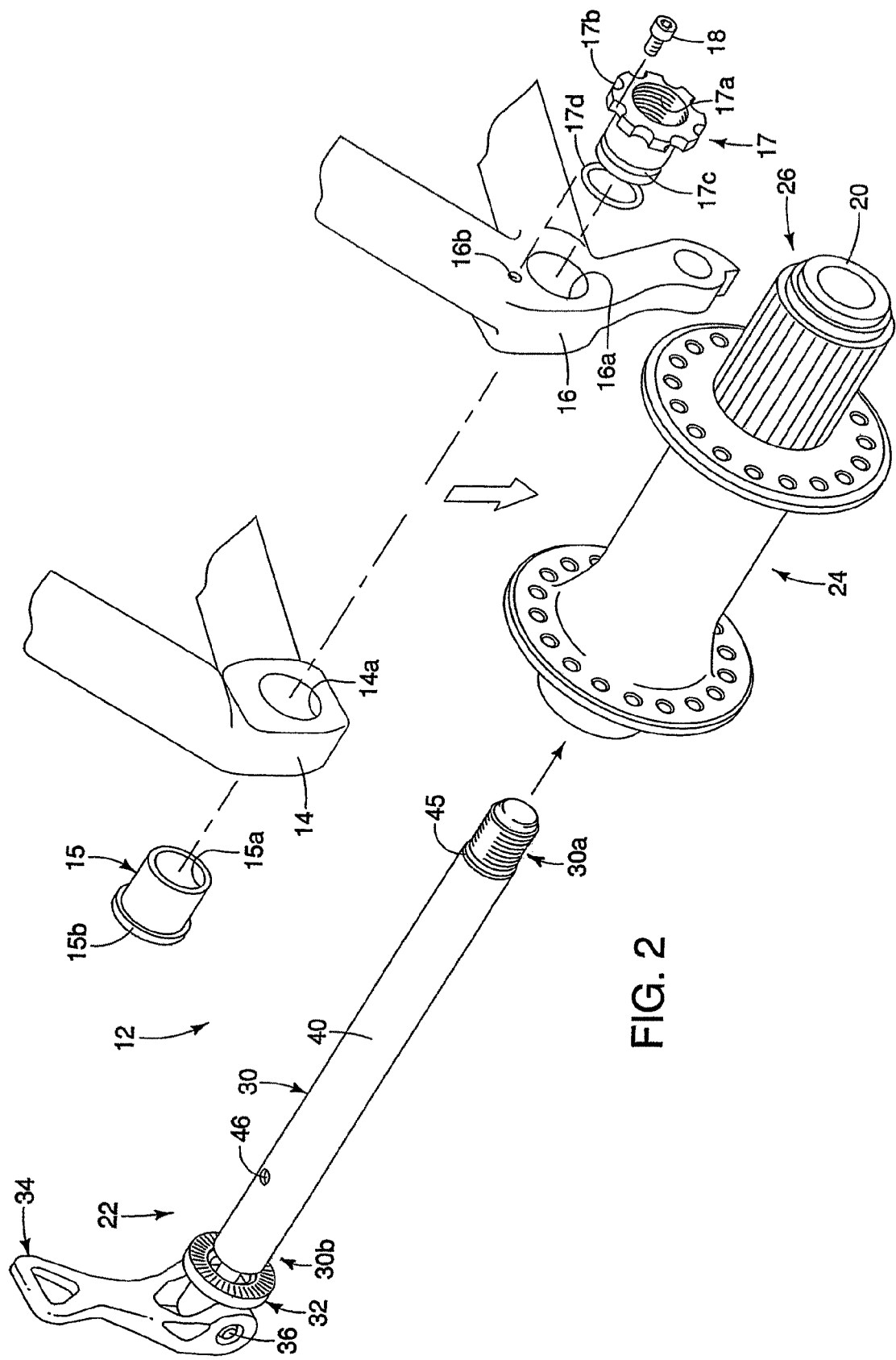
FIG. 2 is an enlarged, exploded perspective view of a portion of the frame and the rear hub illustrated in FIG. 1.

Referring initially to FIGS. 1 and 2, a bicycle 10, which has a rear bicycle hub 12 coupled thereto in accordance with a preferred embodiment of the present invention is illustrated. The rear hub 12 is attached the frame 11 of the bicycle 10 using a bicycle wheel securing axle 22 in accordance with the present invention. Specifically, the frame 11 includes a rear fork or triangle 13 with a pair of hub mounting flanges 14 and 16 formed at the free ends thereof, which have the rear hub 12 attached thereto using the bicycle wheel securing axle 22.

In the illustrated embodiment, the flange 14 preferably has a through hole 14a sized to receive an adapter 15. On the other side, the flange 16 preferably has a through hole 16a sized to receive an adapter 17. Thus, in the illustrated embodiment, the bicycle wheel securing axle 22 is inserted through the adapter 15 and has one end threadedly attached to the adapter 17. An opposite end of the bicycle wheel securing axle 22 has a wheel securing mechanism that is used to securely attach the bicycle wheel securing axle 22 to the other mounting flange 14 in order to attach the rear hub 12 to the rear fork 13 by a clamping action between the mounting flanges 14 and 16. The mounting flanges 14 and 16, and the adapters 15 and 17.

The adapter 15 is mounted in the through hole 14a. The adapter 15 has an internal unthreaded bore 15a to freely rotatably receive part of the wheel securing axle 22 and an annular flange 15b, which abuts against an outside surface of the mounting flange 14. The adapter 17 is mounted in the through hole 16a. The adapter 17 has a partially threaded internal bore 17a to threadedly receive part of the wheel securing axle 22 and a fluted annular flange 17b, which abuts against an outside surface of the mounting flange 16. A locking member such as a bolt 18 is threadedly mounted in a threaded bore 16b of the mounting flange 16 to releasable engage the fluted annular flange 17b in order to releasably prevent rotation of the adapter 17. The adapter further includes an annular groove 17c with a resilient (i.e. elastomeric material) O-ring 17d mounted therein, which engages an annular groove 16c within the through hole 16a to overrideably prevent the adapter 17 from falling out of the hole 16a, even when the wheel securing axle 22 is not attached to the adapter 17. Of course, it will be apparent to those skilled in the bicycle art that various other rear fork structures with or without various adapters may be provided if needed and/or desired.

The bicycle 10 is conventional, except for the manner in which the rear hub 12 is attached to the hub mounting flanges 14 and 16 with the bicycle wheel securing axle 22. Accordingly, the bicycle 10 and its various components will not be discussed and/or illustrated in detail herein, except as related the present invention. Moreover, it will be apparent to those skilled in the bicycle art from this disclosure that various modifications can be made to the bicycle 10 and its components without departing from the present invention.

Referring to FIGS. 2-7, the rear bicycle hub 12 includes a main hub axle 20, the wheel securing axle 22, a hub assembly 24 and a freewheel 26. The rear hub 12 is conventional, except for the wheel securing axle 22. Accordingly, the rear hub 12 will not be discussed and/or illustrated in detail herein, except as related to the wheel securing axle 22 of the present invention. A hub shell (outline shown in broken lines) of the hub assembly 24 and the free wheel 26 are rotatably supported on the main hub axle 20 of the rear hub 12 via a bearing assembly and/or other conventional parts in a conventional manner. The wheel securing axle 22 extends through the main hub axle 20. The free wheel 26 is coupled to the hub shell 24 with a one-way clutch disposed therebetween in a conventional manner. Thus, forward rotation of rear sprockets mounted on the free wheel 26 transmits torque to the hub assembly 24. The hub assembly 24 is coupled to the rear rim via a plurality of spokes in a conventional manner to transmit the forward rotation of the hub assembly 24 to the rear rim (tire).

While the wheel securing axle 22 of the present invention is particularly suited for use with a rear hub such as the rear hub 12 disclosed herein, it will be apparent to those skilled in the bicycle art from this disclosure that the wheel securing axle 22 of the present invention could be used in other types of rear hubs (e.g. internally geared hubs) as well as in various front hubs. Moreover, it will be apparent to those skilled in the bicycle art from this disclosure that that parts of the wheel securing structure 22 may be used as illustrated herein or with minor modifications in order to secure other bicycle components (i.e., other than wheel hubs) to the bicycle 10 without departing from the scope of the present invention.

Referring to FIGS. 2-13, the bicycle wheel securing axle 22 basically includes a shaft member 30, a head member 32, a lever member 34 and a pivot pin 36. The shaft member 30 has a first threaded end portion 30a and a second end portion 30b with a longitudinal center axis X extending between the first and second end portions 30a and 30b, as seen in FIGS. 2-5. A direction parallel to the longitudinal center axis X will be considered an axial/longitudinal direction, while a direction perpendicular to the center axis X will be considered a transverse direction.

The first threaded end portion 30a is designed to be threadedly attached to the adapter 17 of the mounting flange 16. The second end portion 30b is supported by the adapter 15 and has the head member 32 coupled thereto using the lever member 34 and the pivot pin 36. Specifically, the pivot pin 36 is non-rotatably mounted to the lever member 34 and extends through the head member 32 so as to be operatively coupled to the second end portion 30b within the head member 32. Thus, the pivot pin 36 is operatively mounted to the shaft member 30 and the head member 32 to move the shaft member 30 in an axial (longitudinal) direction relative to the head member 32 in response to movement of the lever member 34 about a pivot axis Y of the pivot pin 36.

Figure 4:
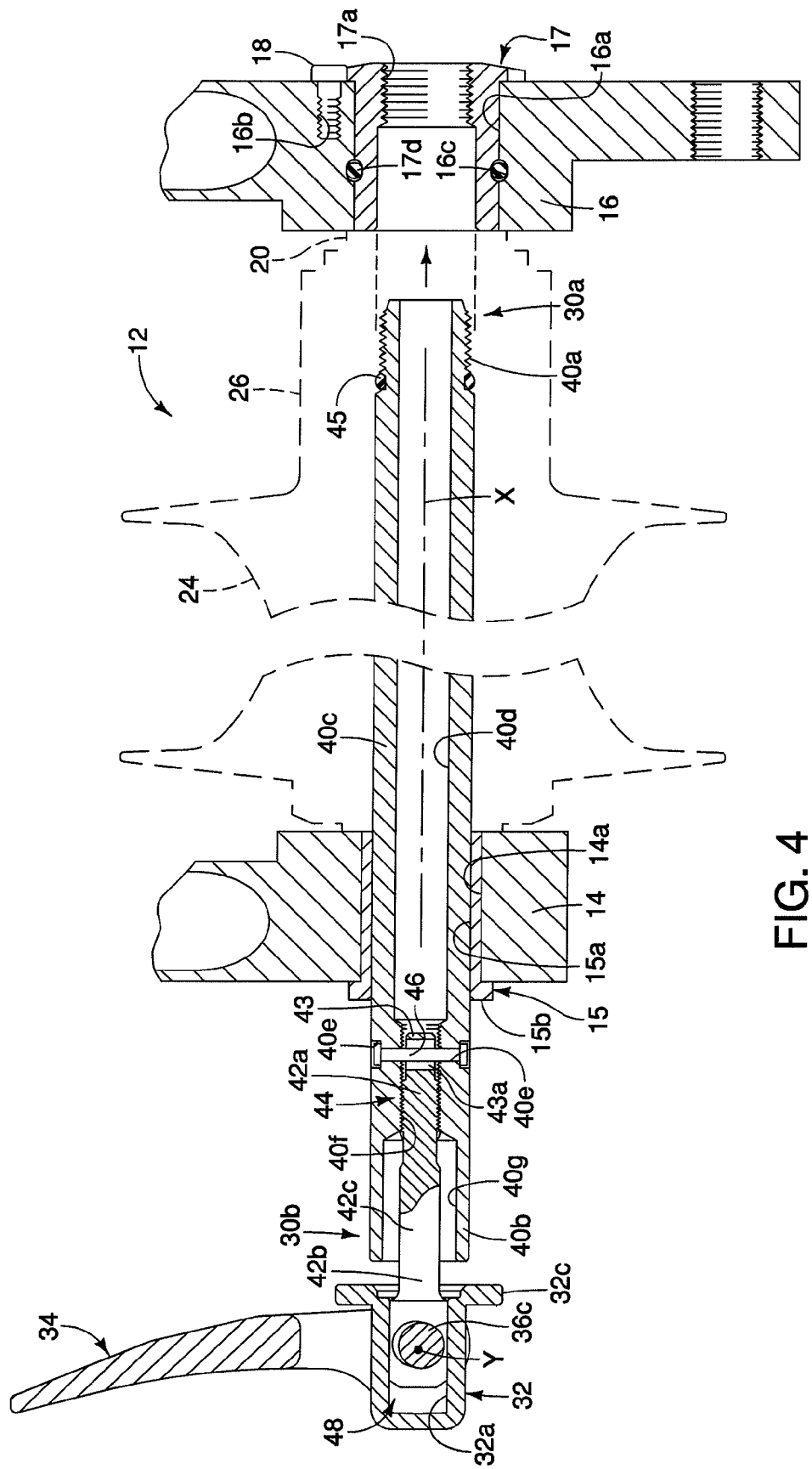
FIG. 4 is an enlarged, partial cross-sectional view of a portion of the frame and the rear hub illustrated in FIG. 1, with the wheel securing axle in a first, partially installed position.
Figure 5:
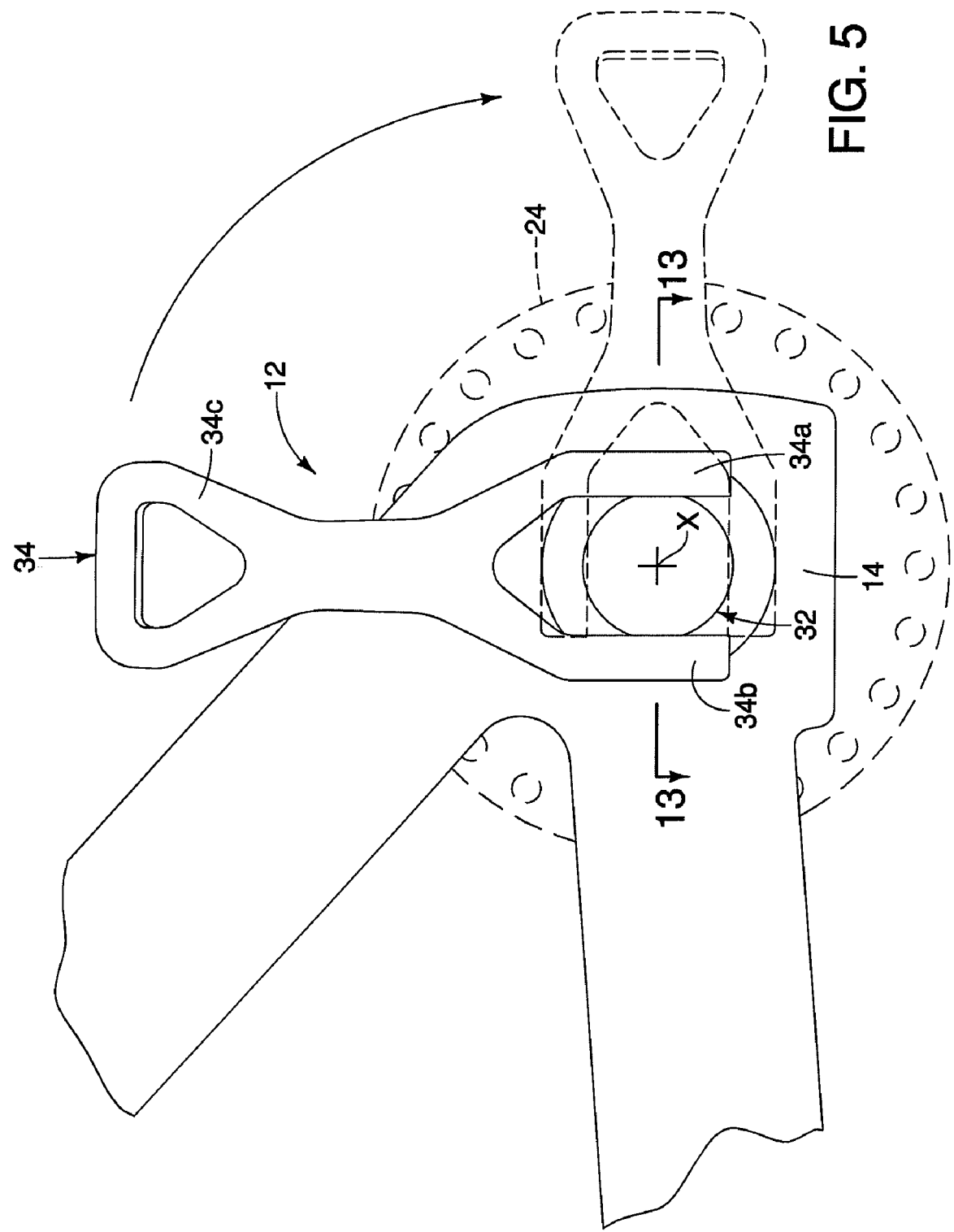
FIG. 5 is an enlarged, end elevational view of the portion of the frame and the rear hub illustrated in FIG. 4, illustrating rotation of the wheel securing axle from the first, partially installed position.
Figure 6:
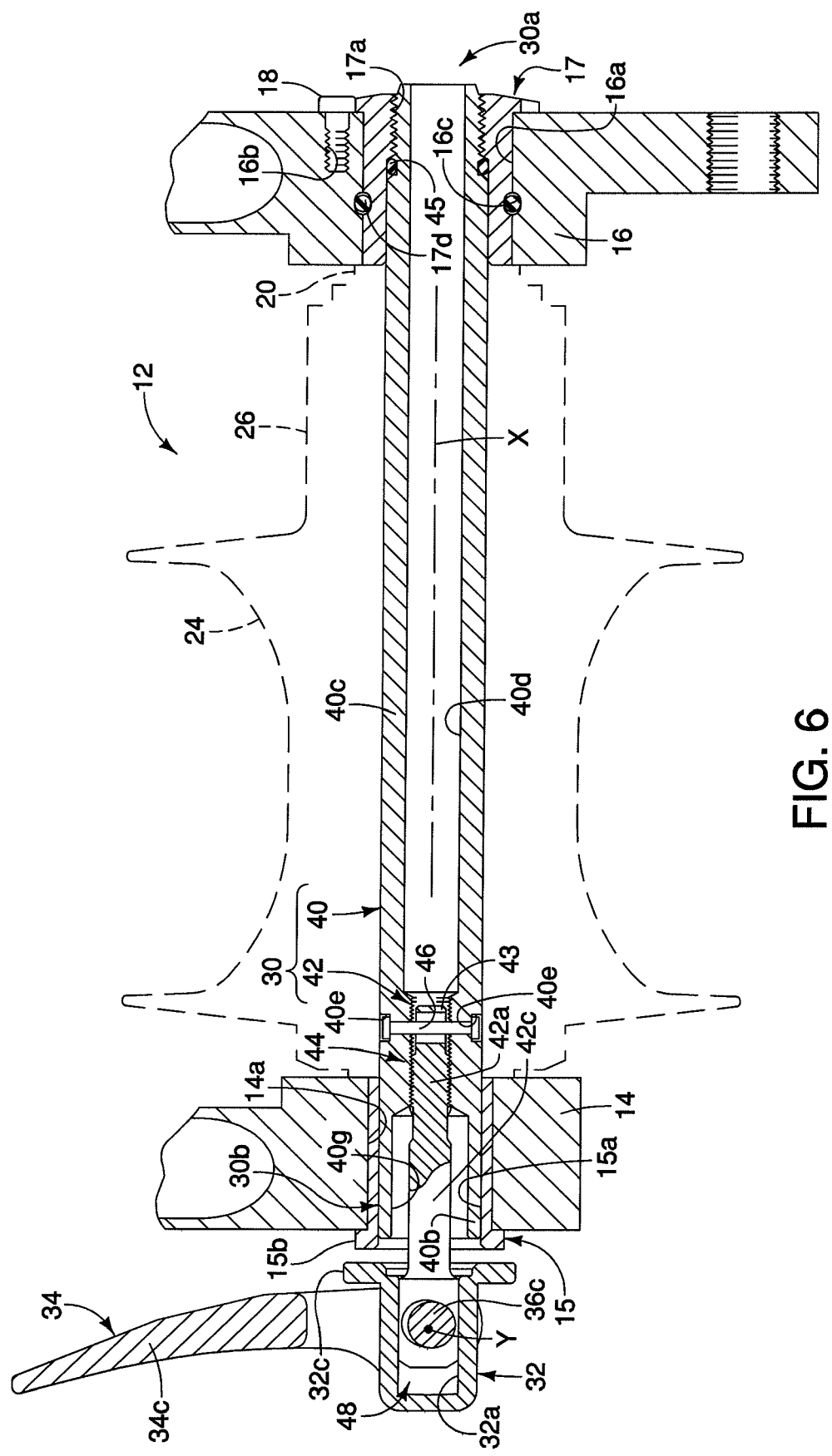
FIG. 6 is an enlarged, partial cross-sectional view of a portion of the frame and the rear hub illustrated in FIG. 1, with the wheel securing axle in a second, partially installed position (i.e. during rotation as illustrated in FIG. 5)
Figure 7:
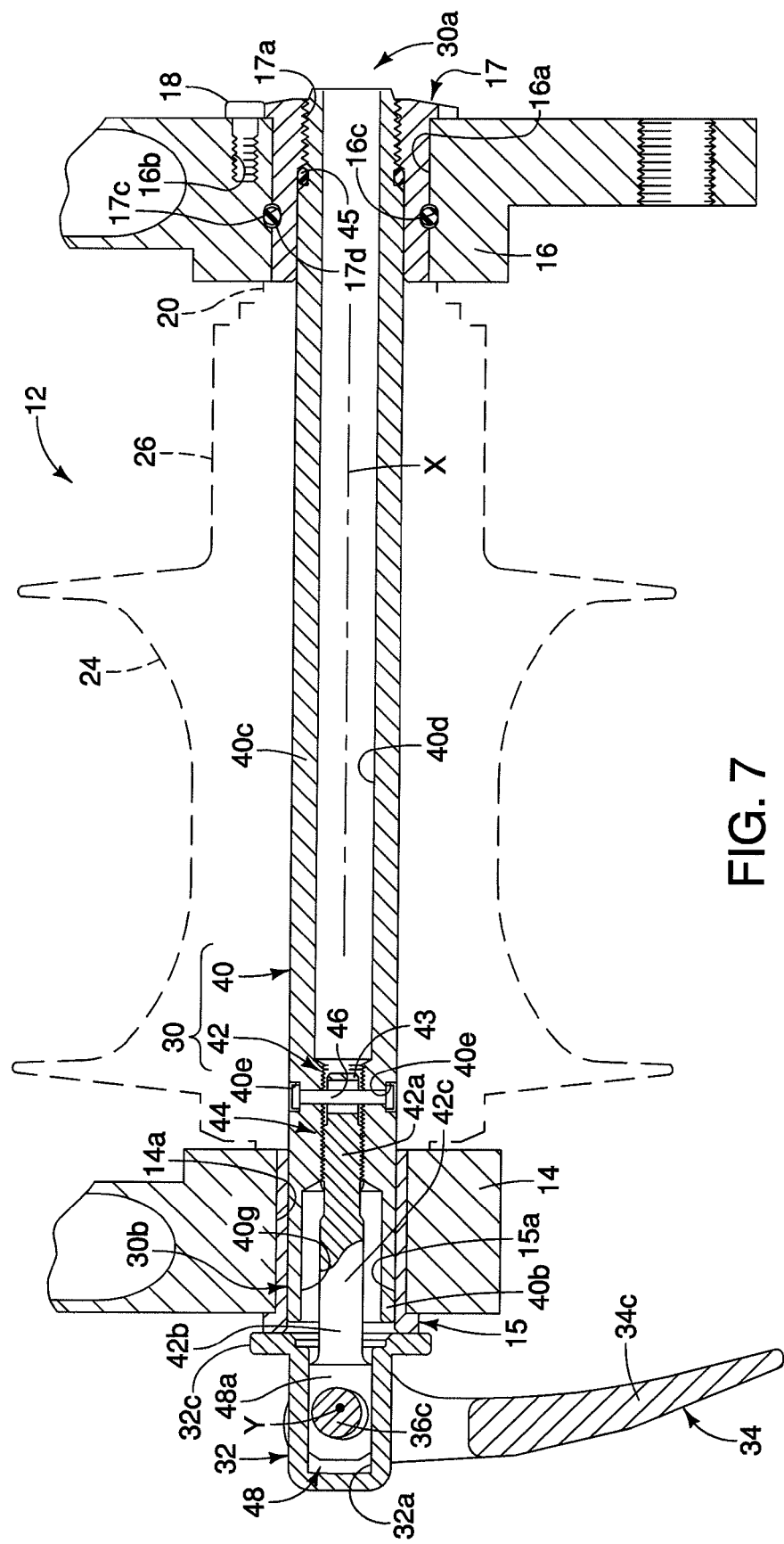
FIG. 7 is an enlarged, partial cross-sectional view of a portion of the frame and the rear hub illustrated in FIG. 1, with the wheel securing axle in a fully installed position after clamping the frame using the securing lever.

The shaft member 30 basically includes an outer axle 40 and an inner axle 42 attached within the outer axle 40 in an installed position, as seen in FIGS. 4, 6 and 7. The outer axle 40 and the inner axle 42 are preferably attached together via a threaded connection 44 and a fastener 46 to prevent axial removal of the inner axle 42 from the outer axle 40 when the inner axle 42 is in the installed position. Prior to installing the fastener 46, the outer and inner axles 40 and 42 are threadedly engaged relative to each other. After the outer and inner axles 40 and 42 are positioned in predetermined axial positions relative to each other, the fastener 46 is installed to prevent relative rotation. In the illustrated embodiment, the fastener 46 is a rivet.

Referring to FIGS. 2-4, 6-8 and 10, the outer axle 40 basically includes a first externally threaded end 40a, a second end 40b, an outer rod portion 40c, an internal bore 40d and a pair of stepped transverse bores 40e. The threaded end 40a is preferably directly threadedly attached to the adapter 17 received in the mounting flange 16. The second end 40b is attached to the mounting flange 14. Specifically, the second end 40b is supported by the adapter 15 that is received in the mounting flange 14. The outer rod portion 40c extends between the first and second ends 40a and 40b. A resilient (i.e., an elastomeric material) O-ring 45 is preferably mounted in a mating groove of the first end 40a, and engages the bore 17a of the adapter 17 to prevent undesired rotation (accidental loosening) of the outer axle 40. Either a mating groove should be provided in the shaft (like this embodiment) or a thinner O-ring may be mounted directly on the threads.

In the illustrated embodiment, the internal bore 40d extends completely through the outer axle 40. The stepped transverse bores 40e are aligned with each other and extend between the internal bore 40d and an external surface of the outer rod portion 40c. The stepped transverse bores 40e have enlarged sections at their radially outer ends to receive the heads of the fastener (rivet) 46. The outer axle 40 preferably has a circular external shape, as viewed along the center axis X, as best understood from FIG. 3. The outer axle 40 is preferably constructed of a lightweight rigid material such as a metallic material utilizing conventional manufacturing techniques such as casting and/or machining. In this embodiment, the first end 40, the second end 40b and the outer rod portion 40c are preferably constructed as a one-piece, unitary member.

In this embodiment, the internal bore 40d is a stepped, through bore with a threaded section 40f and an enlarged unthreaded section 40g extending from the threaded section 40e to an open end at the second end 40b. The inner axle 42 is threadedly attached to the threaded section 40f of the internal bore 40d of the outer axle 40. The inner axle 42 extends out of the enlarged unthreaded section 40g of the internal bore 40d. Thus, the inner axle 42 extends from the second end 40b of the outer axle 40 when the inner axle 42 is in the installed position. The head member 32 is preferably attached to an end of the inner axle 42 extending out of the internal bore 40d, as explained below. The stepped internal bore 40d preferably has a circular internal shape, as viewed along the longitudinal center axis X.

Referring to FIGS. 2-4, 6-8, 11 and 12, the inner axle 42 basically includes a first engagement end 43, a (first) threaded section 42a, a second end 42b, an inner rod portion 42c and a bracket 48. The first threaded section 42a is threadedly attached to the threaded section 40f of the internal bore 40d. The first threaded section 42a and the threaded section 40f constitute parts of the threaded connection 44 when coupled together. The second end 42b extends out of the internal bore 40d. The second end 42b supports the head member 32 and the lever member 34. Specifically, the second end 42b of the inner axle 42 has the bracket 48 attached thereto, which supports the head member 32 and the lever member 34 using the pivot pin 36. The first engagement end 43, the (first) threaded section 42a, the second end 42b and the inner rod portion 42c are preferably constructed integrally as a one-piece, unitary member.

The first engagement end 43 has a cylindrical shape with a transverse, perpendicularly arranged (relative to the longitudinal center axis X) slot 43a extending therethrough to form a through opening through which the fastener (rivet) 46 passes to prevent rotation of the inner axle 42 relative to the outer axle 40. Thus, the inner axle 42 includes at least one opening (slot 43a) that receives at least a portion of a fastener (rivet 46) to prevent rotation between the outer and inner axles 40 and 42.

The inner axle 42 is preferably constructed of a lightweight rigid material such as a metallic material utilizing conventional manufacturing techniques such as casting and/or machining. In this embodiment, the inner axle 42 is constructed as a one-piece, unitary member together with the bracket 48. However, it will be apparent to those skilled in the bicycle art from this disclosure that the bracket 48 can be constructed as a separate member that is fixed to the inner axle 42 (e.g. by welding or the like). In this embodiment, the inner axle 42 is preferably constructed of an iron alloy such as chrome-moly steel, while the outer axle 40 is preferably constructed of an aluminum alloy. In other words, the material of the outer axle 40 preferably has a lower specific gravity than the material of the inner axle 42. It will be apparent to those skilled in the art from this disclosure that this feature (materials of the inner and outer axles).

The bracket 48 preferably has a block configuration with a support portion 48a having an eccentric cam opening 48b formed therein. The eccentric cam opening 48b extends between two flat sides 48c, while a pair of curved sides 48d connect the flat sides. The eccentric cam opening 48b cooperates with the pivot pin 36 to move the inner axle 42 of the shaft member 30 in an axial direction relative to the head member 32 in response to movement of the lever member 34 from a release position shown in FIG. 6 to the fixing position shown in FIG. 7.

Referring to FIGS. 2-8 and 11-13, the head member 32 is basically a cup-shaped member having an internal recess 32a, and external surface 32b and an annular abutment portion 32c with a textured abutment surface arranged and configured to contact the adapter 15. The bracket 48 of the inner axle 42 is non-rotatably received in the recess 32a. In other words, the recess 32a preferably has a shape that mates with the block-shaped support portion 48a of the bracket 48 to prevent relative rotation therebetween. In any case, the lever member 34 is operatively mounted to move the head member 32 in an axial direction relative to the inner axle 42.

In this embodiment, the external surface 32b of the head member 32 has a pair of oppositely facing flat surfaces that are configured to have portions of the lever member adjacent thereto, as explained below. However, it will be apparent to those skilled in the bicycle art that the external surface 32b of the head member 32 can be formed without flat surfaces if needed and/or desired. In any case, the head member 32 further includes a first opening 32d extending from the recess 32a to the external surface 32b and a second opening 32e aligned with the first opening 32d and also extending from the recess 32a to the external surface 32b. The openings 32d and 32e receive portions of the pivot pin 36 therethrough, as explained in more detail below. The openings 32d and 32e are preferably longitudinally slot-shaped openings sized such that the pivot pin 36 is rotatable therein longitudinally slidable therein. The lateral width of the openings 32d and 32e preferably correspond to the diameters of parts of the pivot pin 36 received therein.

Referring to FIGS. 2-8, 11-13 and 16-19, the lever member 34 basically includes a first attachment portion 34a, a second attachment portion 34b and an operating portion 34c extending from the first and second attachment portions 34a and 34b. The lever member 34 is preferably constructed of a lightweight rigid, non-elastically deformable, material such as a metallic material utilizing conventional manufacturing techniques such as casting and/or machining. The first attachment portion 34a, the second attachment portion 34b and the operating portion 34c are preferably integrally constructed together as a one-piece, unitary member. The first and second attachment portions 34a and 34b define a recess therebetween that is sized to receive the head member 32 partially therein. In the illustrated embodiment, the lever member 34 is not plastically deformed in order to move the first and second attachment portions 34a and 34b inwardly or outwardly relative to each other during installation.

The first attachment portion 34a has a first non-circular hole 34d extending between a first inner surface 34e and a first outer most surface 34f lying in a first plane $P_1$ substantially perpendicular to the pivot axis Y. The first hole 34d is aligned with the first opening 32d of the head member 32. In the illustrated embodiment, the first non-circular hole 34d is a splined mating hole that non-rotatably receives part of the pivot pin 36 in a sliding manner. The first inner surface 34e is disposed adjacent the flat surface of the external surface 32b of the head member 32 having first opening 32d extending therefrom. Rotational movement of lever member 34 is preferably transferred to the pivot pin 36 only from the splined mating hole 34d.

The second attachment portion 34b has a second hole 34g extending between a second inner surface 34h and a second outer most surface 34i lying in a second first plane $P_2$ substantially perpendicular to the pivot axis Y. The second hole 34g is aligned with the second opening 32e of the head member 32. In the illustrated embodiment, the second hole 34g is a circular mating hole that receives part of the pivot pin 36 in a sliding manner. The second inner surface 34h is disposed adjacent the flat surface of the external surface 32b of the head member 32 having the second opening 32e extending therefrom. Rotational movement of lever member 34 is preferably not transferred to the pivot pin 36 from the second mating hole 34g. The mating hole 34g has a smaller section 34j adjacent the second inner surface 34h (adjacent the recess) and a larger section 34k adjacent the second outer most surface 34i to form an abutment (annular shoulder) therebetween. The smaller section 34j has a size and shape (i.e., circular in this case) corresponding to part of the pivot pin 36 received therein.

Referring to FIGS. 2-8 and 11-15, the pivot pin 36 basically includes a first non-circular end section 36a, a second end section 36b, a cam section 36c, a first intermediate section 36d and a second intermediate section 36e. The pivot pin 36 is preferably constructed of a lightweight rigid material such as a metallic material utilizing conventional manufacturing techniques such as casting and/or machining. The first non-circular end section 36a, the second end section 36b, the cam section 36c, the first intermediate section 36d and the second intermediate section 36e are preferably integrally constructed together as a one-piece, unitary member.

In the illustrated embodiment, the first non-circular end section 36a has a splined configuration that slidably, non-rotatably mates with the first non-circular hole 34d of the first attachment portion 34a of the lever member 34. The first end section 36a has a generally circular shape as viewed along the pivot axis Y of the pivot pin 36, but an externally splined surface to form a non-circular shape. Of course, it will be apparent to those skilled in the bicycle art from this disclosure that the first end section 36a and first hole 34d could have other non-circular configurations if needed and/or desired. However, a splined configuration is preferred. The first end section 36a has a first maximum transverse width $W_1$. The first non-circular end section 36a of the pivot pin 36 does not project axially away from the head member 32 beyond the first plane $P_1$.

In the illustrated embodiment, the second end section 36b has a circular configuration that slidably, rotatably mates with the second hole 34g of the second attachment portion 34b of the lever member 34. The smaller section 34j of the second mating hole 34g has a size and shape (circular in this case) corresponding to the size and shape of the second end section 36b received therein. In any event, the smaller section 34j of the second mating hole 34g and the second end section 36b received therein are configured such that torque from the lever member 34 is not transferred to the pivot pin 36 by this connection.

However, the second end section 36b is non-rotatable relative to the second attachment portion 34b because of the splined configuration of the first end section 36a and first hole 34d. In other words, the second attachment portion 34b preferably does not transfer torque to the second end section 36b of the pivot pin 36. The second end section 36b has a second maximum transverse width $W_2$ that is smaller than the first maximum transverse width $W_1$. The second end section 36b includes an annular groove 36f and a tapered guide surface 36g. The groove 36f is sized to receive a retaining member 38 such as a C-clip. The tapered guide surface 36g has a conical configuration in order to guide the retaining member 38 onto the second end section 36b and into the groove 36f.

The cam section 36c is disposed between the first and second end sections 36a and 36b. In the illustrated embodiment, the cam section 36c has a circular shape as viewed along the pivot axis Y, with the center of the cam section 36c being offset from the pivot axis Y, as best understood from FIGS. 13-15. Thus, when the lever member 34 and the pivot pin 36 move from the release position shown in FIG. 6 to the fixing position shown in FIG. 7 about the pivot axis Y, the cam section 36c cooperates with the eccentric cam opening 48b to move the inner axle 42 axially (longitudinally) relative to the head member 32. The cam section 36c has a third maximum transverse width $W_3$ that is smaller than the first maximum transverse width $W_1$, but larger than the second maximum transverse width $W_2$.

The first intermediate section 36d is disposed between the first end section 36a and the cam section 36c, while the second intermediate section 36e is disposed between the second end section 36b and the cam section 36c. The first intermediate section 36d has a maximum transverse width that is smaller than the first maximum transverse width $W_1$, but larger than the third maximum transverse width $W_3$. The second intermediate section 36e has a maximum transverse width that is the same as the second maximum transverse width $W_2$. In other words, the pivot pin 36 has a stepped configuration with each successive section being the same size or smaller than the preceding section as the second end section 32b is approached from the first end section 36a. The second intermediate section 36e preferably does not contact the longitudinal ends of the opening 32e. On the other hand, the first intermediate section 36d preferably contacts opposite longitudinal ends of the opening 32d when the lever member 34 is in the release position and the fixing position Referring to FIG. 13, the retaining member (clip) 38 preferably has a radial width $R_1$ that is smaller than a radial space $R_2$ between the second end section 36b of the pivot pin and the larger section 34k of the second hole 34g so that the retaining member 38 can be mounted in the groove 36f within the larger section 34k. In any case, once fully assembled, the second end section 36b of the pivot pin 36 is retained within the second attachment portion 34b of the lever member 34. In other words, the retaining member 38 is preferably disposed within the second attachment portion 34b. Moreover, the second end section 36b of the pivot pin 36 does not project axially away from the head member 32 beyond the second plane $P_2$.

Referring now to FIGS. 2-13, assembly and use of the rear hub 12 having the wheel securing axle 22 in accordance with the present invention will now be explained in more detail. Prior to mounting the rear hub 12 having the wheel securing axle 22 to the mounting flanges 14 and 16, the main hub axle 20, the hub assembly 24 and the free wheel 26 are assembled together as a unit in a conventional manner. The wheel securing axle 22 is assembled as a separate unit from the unit including the main hub axle 20, the hub assembly 24 and the free wheel 26 in accordance with the present invention.

Figure 3:
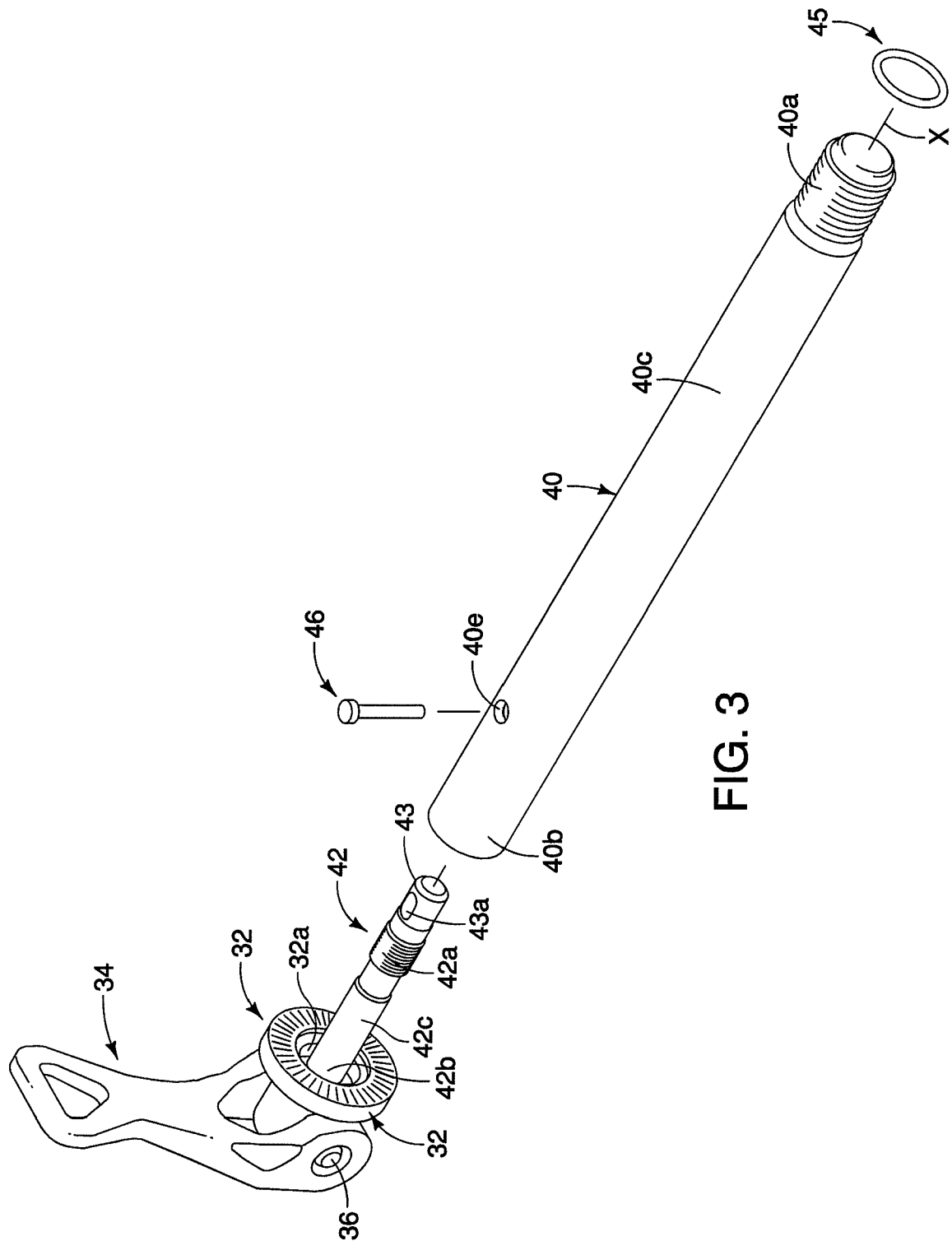
FIG. 3 is an exploded, perspective view of the wheel securing axle of the rear hub illustrated in FIG. 2.
Figure 12:
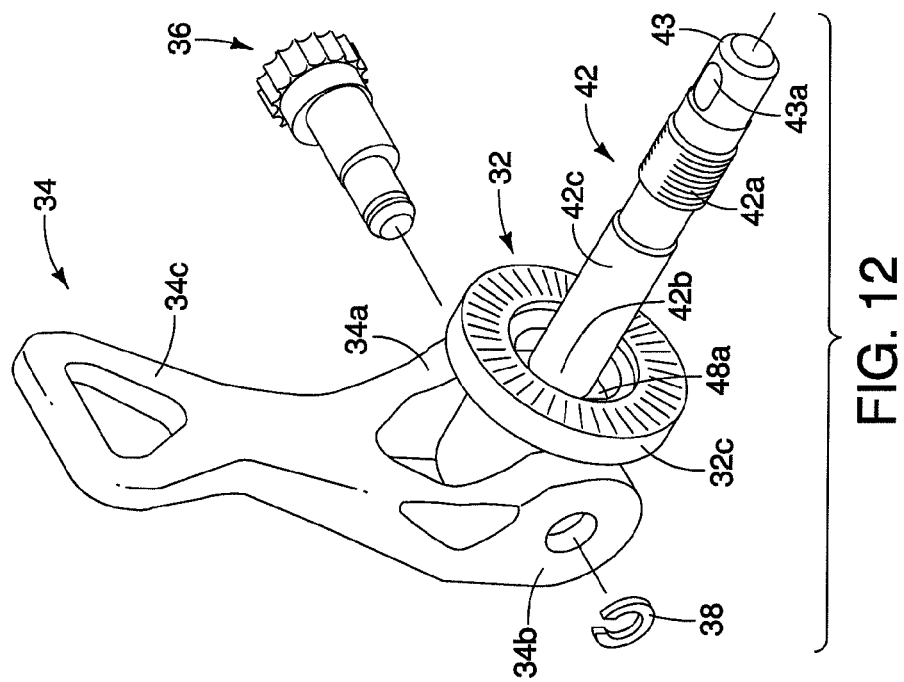
FIG. 12 is a partially assembled, perspective view of the inner axle, head member, lever member and pivot pin illustrated in FIG. 11.
Figure 11:
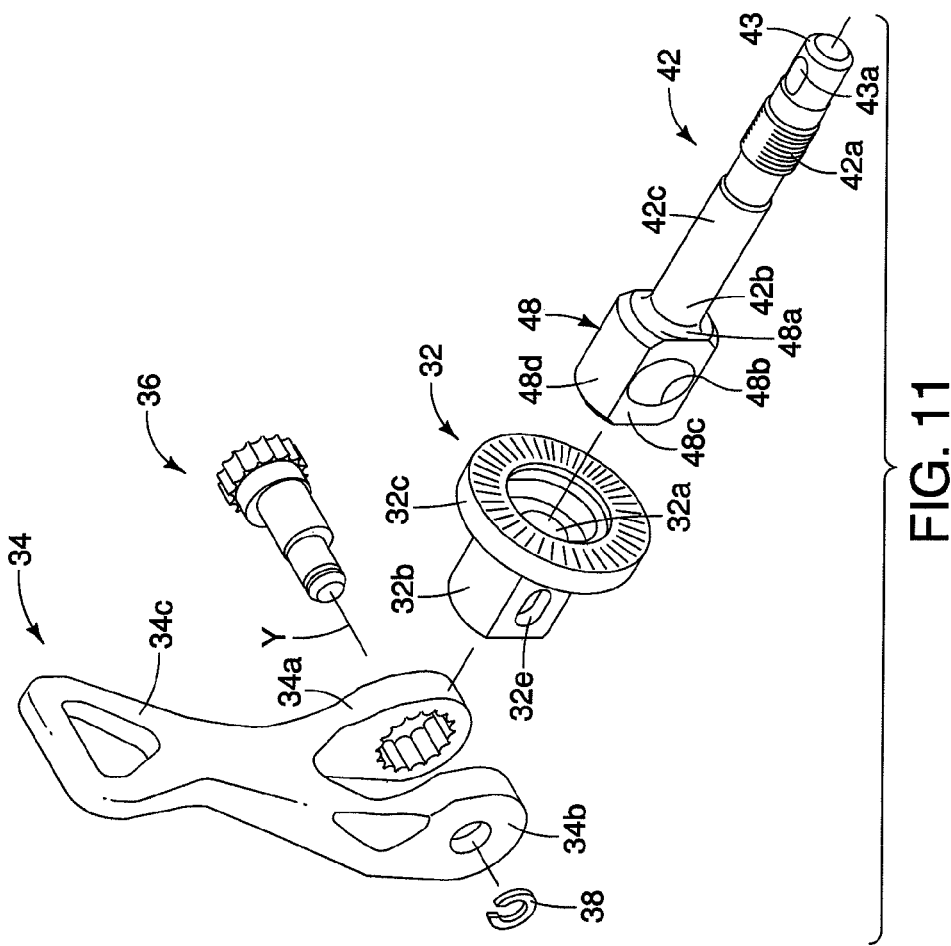
FIG. 11 is an exploded, perspective view of the inner axle, head member, lever member and pivot pin of the wheel securing axle illustrated in FIG. 8.
Figure 14:
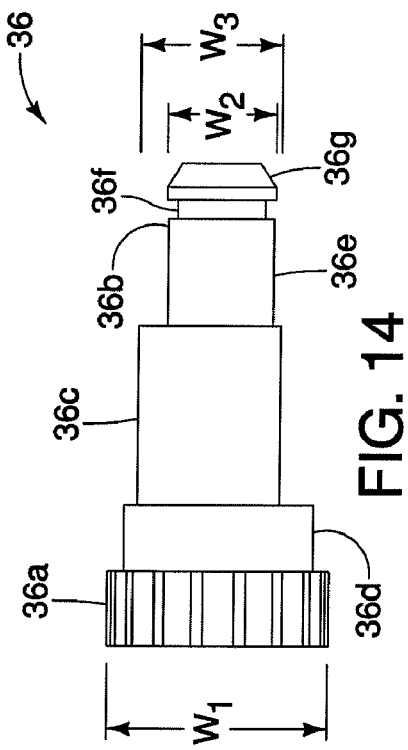
FIG. 14 is an enlarged longitudinal elevational view of the pivot pin of the wheel securing axle illustrated in FIGS. 1-12.
Figure 15:
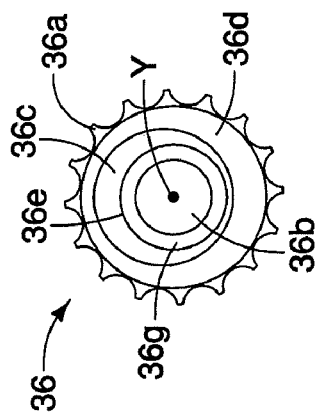
FIG. 15 is an end elevational view of the pivot pin illustrated in FIG. 14 (i.e., as viewed from the smaller end of the pivot pin)
Figure 13:
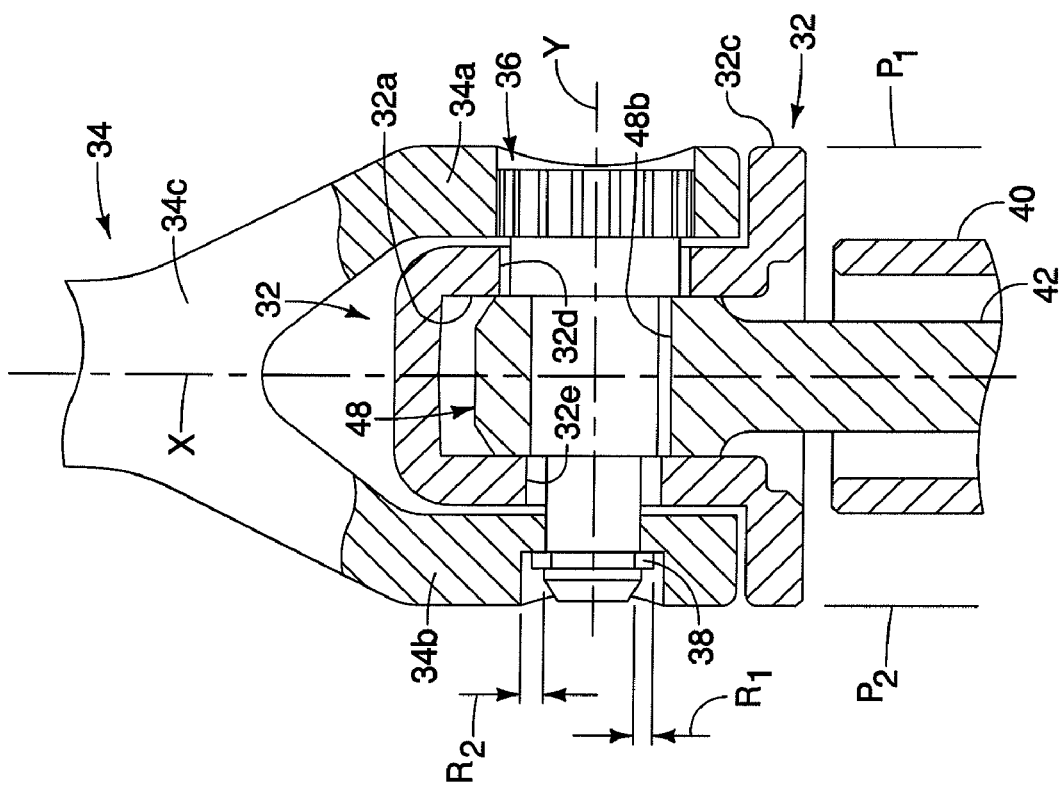
FIG. 13 is an enlarged, partial cross-sectional view of the wheel securing axle illustrated in FIGS. 1-12, as seen along section line 13-13 of FIG. 5 but with the lever moved to a middle (intermediate) position for the purpose of illustration.

In order to assemble the wheel securing axle 22 as a unit, the wheel securing mechanism (i.e., the head member 32, the lever member 34, the pivot pin 36 and the inner axle 42) is assembled as seen in FIGS. 3, 11 and 12. In order to assemble the wheel securing mechanism, the bracket 48 is positioned inside the head member 32 and the first and second attachment portions 34a and 34b of the lever member are positioned on opposite sides of the head member 32, as seen in FIGS. 11-12. Then the pivot pin 36 is installed by inserting the second end section 36b into the first attachment portion 34a, through the head member 32 and into the second attachment portion 34b so that the cam section 36c is disposed within the bracket 48. The inner axle 42 may be attached to the outer axle 40 before or after assembling the wheel securing mechanism.

When attaching the inner axle 42 to the outer axle 40, the inner axle 42 is inserted into the internal bore 40d and threadedly attached to the outer axle 40 such that axial removal of the inner axle 42 is prevented, as best understood from FIGS. 2-6. Then the fastener (rivet) 46 is installed. In this case, the rivet is inserted through the holes 40e and one end is deformed in a conventional manner to secure the fastener (rivet) 46 to prevent rotation of the inner axle 42 relative to the outer axle 40, as best understood from FIGS. 3 and 4. Now, the shaft member 30 is fully assembled.

The unit including the main hub axle 20, the hub assembly 24 and the free wheel 26 can now be attached to the mounting flanges 14 and 16 using the wheel securing axle 22. In order to mount the rear hub 12 to the frame 11, the unit including the main hub axle 20, the hub assembly 24 and the free wheel 26 is positioned between the mounting flanges 14 and 16. The wheel securing axle 22 is then inserted through the adapter 15 of the mounting flange 14, through the main hub axle 20, the hub assembly 24 and the free wheel 26, and threaded into the adapter 17 of the mounting flange 16. Now the lever member 34 can be moved to the fixing position to secure the rear wheel hub 12 to the frame 11. The axial position of the shaft 30, and thus, the head member 32 can be adjusted relative to the frame 11 by rotating the shaft 30 relative to the adapter 17. The rotational position of the adapter 17, and thus the rotational position of the lever member 34 can be adjusted by releasing the bolt 18 and changing the rotational position of the adapter 17.

If the rear wheel needs to be removed, the lever member 34 is moved to the release position, and then the entire wheel securing axle 22 is rotated to detach the shaft 30 from the mounting flange 16. Then the entire wheel securing axle 22 can be axially removed, and the remainder of the rear wheel can be removed from the rear triangle 13 of the bicycle frame 11. The installation procedure above can be repeated to reattach the rear hub 12 to the bicycle frame 11. The head member 32, the lever member 34, the pivot pin 36 and the shaft 30 constitute parts of a component securing structure in accordance with the present invention. Of course, it will be apparent to those skilled in the bicycle art from this disclosure that the shaft 30 can be modified and/or parts of the shaft 30 can be eliminated in order to attach a bicycle component other than a wheel hub, without departing from the scope of the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle component securing structure comprising:

a shaft having a first end portion and a second end portion with a longitudinal axis extending between the first and second end portions;

a head member having a recess with the first end portion of the shaft member at least partially disposed therein;

a lever member having first and second attachment portions disposed on opposite sides of the head member and an operating portion extending from the first and second attachment portions away from the head member; and a pivot pin coupling the head member and the lever member to the first end portion of the shaft member, the pivot pin having a first non-circular end section non-rotatably mounted in a non-circular first mating hole of the first attachment portion such that the lever member and pivot pin rotate together about a pivot axis, a second end section received in a second hole of the second attachment portion, and a cam section disposed between the first and second end sections within the recess of the head member to longitudinally move the shaft member relative to the head member in response to movement of the lever member about the pivot axis, the first non-circular end section having a first maximum transverse width larger than a maximum transverse cam width of the cam section and the maximum transverse cam width of the cam section being larger than a second maximum transverse width of the second end section, the second end section of the pivot pin being retained within the second attachment portion of the lever member with an attachment that prevents torque of the second attachment portion of the lever member from being directly transferred to the second end section of the pivot pin from the second attachment portion of the lever member via the attachment.

2. The bicycle component securing structure according to claim 1, wherein the first attachment portion of the lever member has a first outermost surface facing away from the head member and lying in a first plane substantially perpendicular to the pivot axis, and the first non-circular end section of the pivot pin does not project axially away from the head member beyond the first plane.

3. The bicycle component securing structure according to claim 2, wherein the second attachment portion of the lever member has a second outermost surface facing away from the head member and lying in a second plane substantially perpendicular to the pivot axis, and the second end section of the pivot pin does not project axially away from the head member beyond the second plane.

4. The bicycle component securing structure according to claim 1, wherein the second attachment portion of the lever member has a second outermost surface facing away from the head member and lying in a second plane perpendicular to the pivot axis, and the second end section of the pivot pin does not project axially away from the head member beyond the second plane.

5. The bicycle component securing structure according to claim 4, wherein the second hole includes a smaller section adjacent the recess and a larger section adjacent the second outermost surface of the second attachment portion to form an abutment therebetween, and the second end section has a retaining member mounted thereon that is received in the larger section adjacent to the abutment to retain the second end section within the second attachment portion of the lever member.

6. The bicycle component securing structure according to claim 5, wherein the retaining member is a clip that is received in a groove of the second end section of the pivot pin.

7. The bicycle component securing structure according to claim 1, wherein the second hole includes a smaller section adjacent the recess and a larger section spaced from the recess toward an outermost surface of the second attachment portion to form an abutment therebetween, and the second end section has a retaining member mounted thereon that is received in the larger section adjacent to the abutment to retain the second end section within the second attachment portion of the lever member.

8. The bicycle component securing structure according to claim 7, wherein the retaining member is a clip that is received in a groove of the second end section of the pivot pin.

9. The bicycle component securing structure according to claim 8, wherein the second end section of the pivot pin and the larger section of the second hole are dimensioned to form a radial space therebetween, and the clip has a maximum radial dimension smaller than the radial space.

10. The bicycle component securing structure according to claim 9, wherein the second end section of the pivot pin has a tapered surface disposed between the groove and a free edge thereof 11. The bicycle component securing structure according to claim 8, wherein the second end section of the pivot pin has a tapered surface disposed between the groove and a free edge thereof.

12. The bicycle component securing structure according to claim 7, wherein the smaller section of the second hole has a size and shape corresponding to a part of the second end section that is received therein.

13. The bicycle component securing structure according to claim 1, wherein the first non-circular end section includes axially extending external splines that are circumferentially arranged about pivot axis and the first non-circular mating hole includes mating axially extending internal splines that are circumferentially arranged about pivot axis.

14. The bicycle component securing structure according to claim 13, wherein the first non-circular end section and the first non-circular mating hole are sized and configured to be slidable relative to each other.

15. The bicycle component securing structure according to claim 1, wherein the first non-circular end section and the first non-circular mating hole are sized and configured to be slidable relative to each other.

16. The bicycle component securing structure according to claim 1, wherein the pivot pin includes a first intermediate section disposed between the first end section and the cam section, the first intermediate section being rotatably supported within a first mating opening of the head member.

17. The bicycle component securing structure according to claim 16, wherein the pivot pin includes a second intermediate section disposed between the second end section and the cam section, the second intermediate section being rotatably received within a second opening of the head member.

18. The bicycle component securing structure according to claim 17, wherein the second opening of the head member is larger than the second intermediate section so as not to contact the second intermediate section of the pivot pin.

19. The bicycle component securing structure according to claim 1, wherein the pivot pin includes a second intermediate section disposed between the second end section and the cam section, the second intermediate section being rotatably received within a second opening of the head member.

20. The bicycle component securing structure according to claim 19, wherein the second opening of the head member is larger than the second intermediate section so as not to contact the second intermediate section of the pivot pin.

21. The bicycle component securing structure according to claim 1, wherein the attachment portions of the lever member are integrally formed together as a one-piece, unitary member.

22. The bicycle component securing structure according to claim 1, wherein the cam section of the pivot pin is received in an eccentric cam opening of the shaft member in order to longitudinally move the shaft member relative to the head member in response to movement of the lever member about the pivot axis.

23. A bicycle component securing structure comprising:

a shaft having a first end portion and a second end portion with a longitudinal axis extending between the first and second end portions;

a head member having a recess with the first end portion of the shaft member at least partially disposed therein;

a lever member having first and second attachment portions disposed on opposite sides of the head member and an operating portion extending from the first and second attachment portions away from the head member; and a pivot pin coupling the head member and the lever member to the first end portion of the shaft member, the pivot pin having a first non-circular end section non-rotatably mounted in a non-circular first mating hole of the first attachment portion such that the lever member and pivot pin rotate together about a pivot axis, a second end section received in a second hole of the second attachment portion, and a cam section disposed between the first and second end sections within the recess of the head member to longitudinally move the shaft member relative to the head member in response to movement of the lever member about the pivot axis, the first non-circular end section having a first maximum transverse width larger than a maximum transverse cam width of the cam section and the maximum transverse cam width of the cam section being larger than a second maximum transverse width of the second end section the second hole including a smaller section and a larger section that form an abutment therebetween, the second end section having a retaining member mounted thereon that is received in the larger section adjacent to the abutment to retain the second end section within the second attachment portion of the lever member, and the smaller section of the second hole having an internal surface with a size and shape corresponding to an outer surface of a part of the second end section that is received therein without torque being transferred from the internal surface to the outer surface of the part of the second end section when the lever member is operated.

\* \* \* \* \*